Feb. 10, 1970          A. M. ALAGNA          3,494,208

SELF-CONTAINED, FLUID-DRIVEN PULLEY CONSTRUCTION

Filed Aug. 21, 1968

INVENTOR
ANTHONY M. ALAGNA
By *Norman Volsk*
Attorney

United States Patent Office 3,494,208
Patented Feb. 10, 1970

3,494,208
SELF-CONTAINED, FLUID-DRIVEN PULLEY
CONSTRUCTION
Anthony M. Alagna, La Grange, Ill., assignor to Pettibone
Mulliken Corporation, Chicago, Ill., a corporation of
Delaware
Filed Aug. 21, 1968, Ser. No. 754,301
Int. Cl. F16h 55/36
U.S. Cl. 74—230.01                                7 Claims

ABSTRACT OF THE DISCLOSURE

A power-driven pulley construction wherein the rotatable, cylindrical, pulley drum, together with a pair of end caps, completely surrounds and encloses a fixed, non-rotatable, fluid-motor, the entire assembly constituting a self-contained or unitary package-type unit.

---

The improved fluid-driven pulley construction comprising the present invention is designed for use primarily in connection with moving an endless conveyor belt for transporting loose materials, such, for example, as sand, coal, ore, and other comminuted materials. The invention is, however, not limited to such use and, if desired, the present pulley construction may be found useful as the driving pulley for a wide variety of conveyor belts such as are employed for moving packaged or unpackaged objects regardless of their nature. Furthermore, the present pulley construction is not necessarily limited to use in connection with a conveyor belt and it may, if desired, and with or without modification as required, be employed as a prime mover for a drum which is associated with various types of winches or the like. Similarly, if desired, the present pulley construction may be caused to serve as the central hub mounting for a rotatable driving element regardless of the mechanism that is driven thereby or it may serve as a wheel hub for locomotive traction purposes. In any installation with which the present pulley construction is associated, it may serve as the sole power-applying means or it may serve merely as one of several such constructions which, in combination with one another, provide a multiple unit drive. Irrespective, however, of the particular use to which the invention may be put, the essential features thereof are at all times preserved.

It is among the principal objects of the present invention to provide a pulley construction of the character briefly outlined above and in which novel means are provided for rotatably and drivingly supporting the pulley drum from the central stationary fluid motor, such means affording not only radial support but axial support as well so that any tendency for end sway or displacement of the drum is obviated. In carrying out this object, the invention contemplates the provision of a roller bearing support at each end of the drum, together with novel means whereby, by means of a single screw adjustment, all lost motion in both bearing supports may be taken up, the adjustment being readily made either on a work bench when the pulley construction is undergoing assembly, or in the field at a scene of installation and with the pulley in operation.

The provision of a pulley construction which is extremely simple in its construction and, therefore, may be manufactured at a low cost; one which is comprised of a minimum number of parts and, therefore, is unlikely to get out of order; one which is rugged and durable and, therefore, will withstand rough usage; one which is capable of ease of assembly and dismantlement for purposes of inspection of parts, repair, or replacement thereof; one which is devoid of complicated gearing for gear reduction purposes; one in which adequate lubrication of the relatively moving parts may be accomplished by application thereto of a conventional pressure grease gun; one which is smooth and silent in its operation; and one which otherwise is well adapted to perform the services required of it, are further desirable features which have been borne in mind in the production and development of the present invention.

Other objects and advantages of the invention, not at this time enumerated, will become readily apparent as the following description ensues.

The invention consists in the several novel features hereinafter set forth and more particularly defined by the claims at the conclusion hereof.

In the accompanying single sheet of drawings forming a part of this specification, one illustrative embodiment of the invention is shown.

Figure 1:
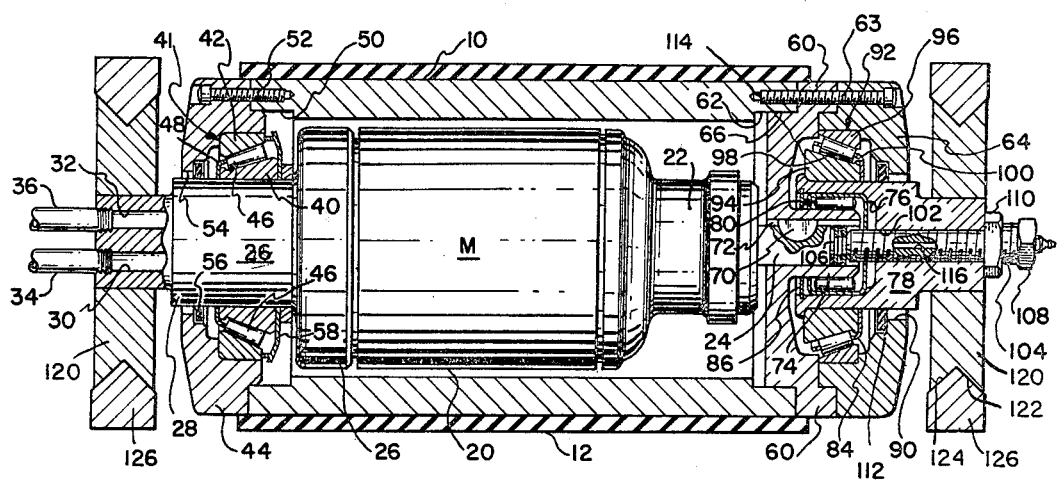
FIG. 1 is a sectional view, partly in elevation, taken substantially centrally and longitudinally through a fluid-driven pulley construction embodying the principles of the present invention.
Figure 2:
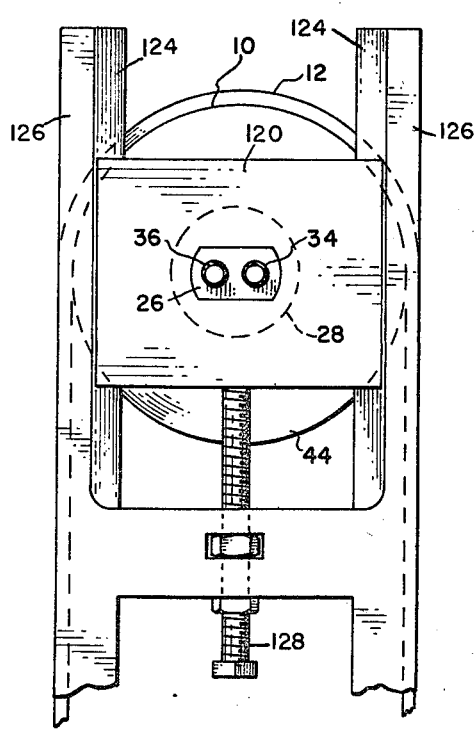
FIG. 2 is an elevational view from one end of the pulley construction of FIG. 1.
Figure 3:
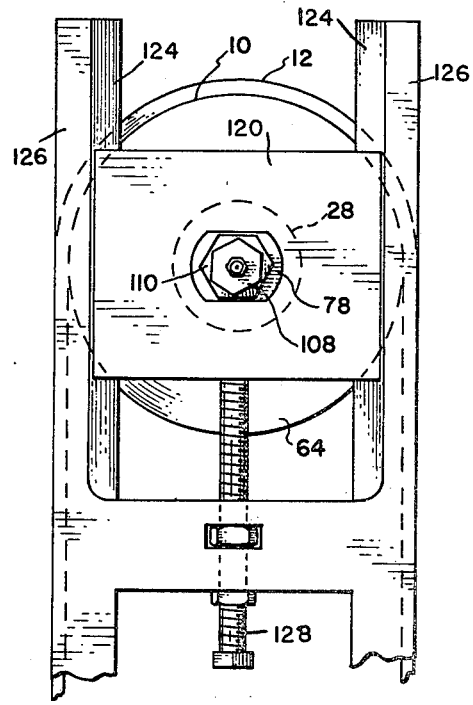
FIG. 3 is an elevational view from the other end of the improved pulley construction.

Referring now to the drawings in detail, the pulley construction of the present invention involves in its general organization an outer pulley drum 10, the axial extent of which may vary within certain limits but which preferably is on the order of the width of the particular endless belt which is adapted to be driven by the pulley construction. Such a belt is identified in FIG. 1 of the drawings by the reference numeral 12. The drum is of tubular cylindrical design or configuration and the side wall thereof is of appreciable thickness. The drum 10 is adapted to be driven in either direction of rotation by means of a central or inner hydraulic motor M which is substantially completely enclosed by the drum 10, the latter being concentric with both the motor housing and the motor drive shaft and being supported therefrom in a manner that will be made clear presently.

While various forms of hydraulic motors may be capable of use in connection with the invention, the particular motor which has been selected for exemplary purposes herein is of the type that is manufactured for and sold by Racine Hydraulics and Machinery, Inc. of Racine, Wis. under the trade name "Torqmotor." The details of the motor M have not been disclosed herein, it being sufficient to say that the motor is of the generated-rotor type, has a speed range of from 5 to 500 r.p.m., and is capable of maintaining high torque at low output speeds. Delivered torque is dependent upon fluid pressure, while output speed is dependent upon the rate of fluid delivery to the motor.

As best shown in FIG. 1, the motor M is provided with a stationary, generally cylindrical, fixed, non-rotatable, outer casing 20 and it has at one end thereof an outwardly extending reduced neck portion 22 from which the motor output shaft 24 projects outwards. To accommodate the requirements of the present invention, the original cap or closure plate (not shown) on the other end of the motor casing, as manufactured, is replaced with a special end cap 26 having a reduced, outwardly extending, cylindrical extension 28 through which there extends in an axial direction a fluid inlet passage 30 and a fluid outlet passage 32. These two passages are adapted to be operatively connected to a fluid inlet line 34 and a fluid outlet return line 36, respectively.

The left-hand end of the drum 10, as viewed in FIG. 1, is rotatably supported from the non-rotatable end cap 26 while the right-hand end of the drum is supported from and rotatable with the output shaft 24 of the motor M. Accordingly, the reduced, cylindrical extension 28 of the end cap 26 has press-fitted or otherwise secured thereto the inner race 40 of a conventional, tapered-type roller bearing assembly 41, the outer race 42 thereof being press-fitted or otherwise secured in an annular closure member 44 for the adjacent end of the drum 10. The rollers 46 of the bearing assembly 41 travel between the two races 40 and 42 and are carried in the usual cage 48 which maintains them in their circumferentially spaced relationship and at the desired angle with respect to the axis of the bearing assembly. The closure member 44 is piloted in an annular recess 50 in the adjacent end of the drum 10 and is fixedly secured in place by means of an annular series of countersunk bolts 52. The reduced cylindrical extension 28 on the end cap 26 projects outwardly through the central opening 54 in the annular closure member 44, and an annular seal 56 prevents the escape of lubricant through said opening. An annular lubricant seal 58 is provided on the side of the bearing assembly 41 that is remote from the seal 56.

At the end of the drum that is adjacent to the output shaft 24, a combined mounting and driving ring 60 is piloted in an annular recess 62 in the adjacent end of the drum, the ring 60 being clamped to said adjacent drum and by means of an annular series of countersunk bolts 63 which also serve to clamp a circular, dished, closure plate 64 in position against the ring 60. The closure plate 64 is piloted in an annular recess 66 in the outer portion of the ring 60.

The drive or output shaft 24 of the hydraulic motor M projects into the central opening of the ring 60 and is slidably keyed to the ring by means of a key 70 which is sealed in a groove in the output shaft and rides in a longitudinal key recess 72 in said ring. The combined mounting or drive ring 60 is provided with an outwardly projecting tubular extension 74 through which the motor output shaft 24 partially extends. This extension 74 projects into a socket-like recess 76 in the inner end of a fixed or non-rotatable pulley hub 78. The wall of the recess 76 is spaced outwards from the wall of the extension 74 and a roller bearing assembly 80 is interposed between the two walls. The bearing assembly 80 (see FIG. 1) includes a series of bearing rollers, a bearing retainer, and a snap ring, the latter serving to maintain the retainer and its associated rollers in position within the socket-like recess 76.

The hub 78 projects through a central opening 90 in the annular closure plate 64 and a tapered roller bearing assembly 92, similar to the bearing assembly 42, is interposed between the wall of the socket 76 and the generally cylindrical wall of the dished closure plate 64. The bearing assembly 92 includes an inner fixed or non-rotatable bearing race 94 which is press-fitted on the wall of the socket 76, an outer rotatable bearing race 96 which is press-fitted in the aforementioned wall of the closure plate 64, and a series of bearing rollers 98 which are mounted or carried in a retainer 100.

The non-rotatable pulley hub 78 is formed with an axial, screw-threaded bore 102 which receives an adjusting screw 104. The inner end of the adjusting screw directly opposes the outer end of the motor drive or output shaft 24 and a small thrust bearing assembly 106 is interposed between the adjacent ends of the shaft 24 and the screw 104. The exposed or outer end of the adjusting screw 104 is formed with square or other non-circular head 108 for reception thereover of a suitable adjusting wrench by means of which the adjusting screw may be turned in either direction for bearing adjusting purposes as will be described presently. A lock nut 110 serves to lock the adjusting screw 104 in any selected adjusted position. A suitable oil seal 112 prevents the escape of lubricant from a chamber 114 which is afforded by the three pulley parts 60, 64 and 78, this chamber serving to supply lubricant to the three bearing assemblies 92, 80 and 106. Lubricant is supplied to the chamber 114 through a small axial bore 116 which extends completely through the adjusting screw 104 and communicates at its forward or outer end with a conventional "Alemite" or other pressure fitting.

From the above description, it will be apparent that when fluid under pressure is supplied to the motor M through the inlet passage 30, the output shaft 24 of the motor will rotate in one direction and thus establish a drive for the pulley drum 10, the driving connection between the shaft and drum extending from the shaft through the key 70 and driving ring 60. Although the passage 30 is designated herein as being the inlet passage while the passage 32 is designated as the return passage, the characteristics of the motor M are such that maximum torque and speed may be attained when the motor is thus operated. However, by supplying fluid under pressure to the passage 32, the direction of rotation of the motor shaft 24 may be reversed, in which case the passage 30 functions as a fluid return passage, operation of the motor in this manner being permissible under limited circumstances as, for example, when load return for placement purposes on the conveyor belt 12 is desired or when the pulley construction is employed in the manner of a winch and it is desired to return the winch cable to its retracted or starting position.

It is to be noted that tightening of the adjusting screw 104 serves to shift the motor shaft 24 and the hub 78 in opposite directions away from each other. This has the effect of forcing the entire motor M to the left (as viewed in FIG. 1) within the confines of the drum 12 so as to compress the bearing rollers 98 between the two bearing races 94 and 96. At the same time, because the motor M shifts with respect to the closure plate 44, the bearing rollers 46 similarly become compressed between the two bearing races 40 and 42 of the bearing assembly 41. The adjusting screw 104 is thus common to both bearing assemblies 41 and 92 so that a single adjustment will accommodate both assemblies. Furthermore, although the adjusting screw ordinarily is manipulated initially at the factory to attain the desired bearing pressures, if necessary, an adjustment may be made in the field with the pulley construction in operation to take up any looseness that may occur due to wear or for any other reason.

It will be understood that in the course of any given pulley construction installation, suitable means will be provided for supporting the opposite ends of the pulley construction. Usually, for belt-tightening purposes, both the hub 78 and the extension 28 of the motor casing 20 will be carried in respective slide blocks such as are shown at 120. These slide blocks are formed with V-shaped side channels 122 which slidably receive V-shaped ribs 124 on respective pairs of rails 126. Tightening screws 128 certain ends of which bear against the slide blocks 120, are provided for the purpose of adjusting the tension in the belt 12.

Having thus described the invention what I claim as new and desire to secure by Letters Patent is:

1. A pulley construction comprising a fluid motor including a tubular motor casing having first and second end caps, a drive shaft projecting forwardly from the first end cap, a cylindrical, open-ended, rotatable pulley drum encompassing said motor casing and concentric therewith, said second end cap projecting outwardly beyond the open adjacent end of said drum and adapted to be secured to a stationary support, a first bearing member secured to said adjacent open end of the drum, a first bearing assembly encompassing the second end cap and effectively interposed between said second end cap and said bearing member, a second bearing member secured to the other open end of the drum, a pulley hub positioned outwards of the motor shaft and adapted to be secured to a stationary support, a second bearing assembly effectively interposed between said hub and said second bearing member, and a driving ring surrounding said motor shaft, and operatively connecting the latter to the drum in driving relationship.

2. A pulley construction as set forth in claim 1 and wherein said first and second roller bearing assemblies are of the tapered roller bearing type.

3. A pulley construction as set forth in claim 2 and wherein the first roller bearing assembly includes an inner race secured to the second end cap, and outer race secured to the first bearing member, and a series of bearing rollers interposed between said inner and outer races and are arranged so that their axes converge outwardly, said second roller bearing assembly includes an inner race secured to the pulley hub, an outer race secured to the second bearing member, and a series of bearing rollers interposed between said two latter races and arranged so that their axes converge outwardly and the motor is bodily shiftable in an axial direction within the pulley drum, said pulley construction including, additionally, means for shifting the position of said motor in a direction tending to increase the pressure of the bearing races against their respective bearing rollers.

4. A pulley construction as set forth in claim 3 and wherein said means for shifting the position of the motor comprises an adjusting screw projecting through said hub and effectively bearing against the outer end of the motor shaft.

5. A belt driving pulley construction as set forth in claim 1 and wherein the driving ring encompasses the motor drive shaft in spaced concentric relationship, said pulley construction including, additionally, a third bearing assembly interposed between the driving ring and the motor drive shaft.

6. A pulley construction as set forth in claim 5 and including, additionally, a fourth bearing assembly interposed between the outer end of the motor drive shaft and the inner end of the adjusting screw.

7. A pulley construction as set forth in claim 6 and wherein said adjusting screw is formed with a small diameter longitudinal bore therethrough, the inner end of the bore directly opposing said fourth bearing assembly, and the outer end of the bore being provided with a pressure fitting for introduction of lubricant into the bore.

References Cited

UNITED STATES PATENTS

| | | | |
|---|---|---|---|
| 2,941,411 | 6/1960 | Wilhelm et al. | 74—230.01 |
| 3,005,357 | 10/1961 | Christian | 74—230.01 XR |

FRED C. MATTERN, JR., Primary Examiner

JAMES A. WONG, Assistant Examiner